United States Patent
Heinks et al.

(10) Patent No.: US 9,297,678 B2
(45) Date of Patent: Mar. 29, 2016

(54) ACOUSTIC FLOW RATE METER HAVING A HIGH FREQUENCY INDUCTION COIL MOUNTED DIRECTLY ON THE PIPING WITHOUT AN ACOUSTIC COUPLING

(75) Inventors: Carsten Heinks, Neuenhaus (DE); Evgeny Twerdowski, Lingen (DE)

(73) Assignee: Rosen Swiss AG, Stans (CH)

( * ) Notice: Subject to any disclaimer, the term of this patent is extended or adjusted under 35 U.S.C. 154(b) by 219 days.

(21) Appl. No.: 14/008,640

(22) PCT Filed: Feb. 2, 2012

(86) PCT No.: PCT/EP2012/000466
§ 371 (c)(1),
(2), (4) Date: Jan. 22, 2014

(87) PCT Pub. No.: WO2012/130353
PCT Pub. Date: Oct. 4, 2012

(65) Prior Publication Data
US 2014/0137662 A1    May 22, 2014

(30) Foreign Application Priority Data
Mar. 31, 2011 (DE) .......................... 10 2011 015 677

(51) Int. Cl.
*G01F 1/66* (2006.01)
*G01S 15/58* (2006.01)

(52) U.S. Cl.
CPC ...... *G01F 1/66* (2013.01); *G01F 1/667* (2013.01); *G01S 15/58* (2013.01)

(58) Field of Classification Search
None
See application file for complete search history.

(56) References Cited

U.S. PATENT DOCUMENTS

| | | | |
|---|---|---|---|
| 4,336,719 | A | 6/1982 | Lynnworth |
| 4,628,725 | A | 12/1986 | Gouilloud et al. |
| 4,838,127 | A | 6/1989 | Herremans et al. |
| 4,893,496 | A | 1/1990 | Bau et al. |
| 5,608,164 | A | 3/1997 | MacLauchlan |
| 5,813,280 | A | 9/1998 | Johnson et al. |

(Continued)

FOREIGN PATENT DOCUMENTS

| DE | 19542232 A1 | 5/1997 |
|---|---|---|
| DE | 102010063535 A1 | 6/2012 |

(Continued)

OTHER PUBLICATIONS

Russian Manual of a Flowmeter PIR RG601.

*Primary Examiner* — Harshad R Patel
(74) *Attorney, Agent, or Firm* — Husch Blackwell LLP

(57) ABSTRACT

Acoustic flow rate meter for the noninvasive determination of the flow or the flow rate in electrically conductive objects through which media flow, in particular pipes or pipelines, having an excitation transducer for generating at least one ultrasonic wave in the object, which is coupled into the medium as a longitudinal wave on an inner side of the object oriented toward the medium, and having a receiving transducer for the detection of an ultrasonic signal in the object, wherein the ultrasonic signal at least partially results due to the longitudinal wave, wherein the excitation transducer is implemented as a high-frequency induction coil, while omitting an acoustic coupling of the excitation transducer with the surface of the object, to generate a varying magnetic field in a surface-proximal region of the object, which is metallic in particular, and the ultrasonic wave is generated by interaction of the varying magnetic field with a static or quasi-static magnetic field in this region.

22 Claims, 22 Drawing Sheets

(56) References Cited

U.S. PATENT DOCUMENTS 5,955,671 A * 9/1999 Gilmore et al. ............... 73/597
6,752,026 B1 * 6/2004 Hyde ....................... 73/861.15
2006/0027022 A1 * 2/2006 Flora et al. .................... 73/627
2008/0276711 A1   11/2008 Nichiforenco et al.
2010/0192703 A1    8/2010 Huang et al.

FOREIGN PATENT DOCUMENTS

| GB | 2142431 A | 1/1985 |
| JP | 02269914 A | 11/1990 |
| JP | 11325868 A | 11/1999 |
| JP | 2001074759 A | 3/2001 |

* cited by examiner

ACOUSTIC FLOW RATE METER HAVING A HIGH FREQUENCY INDUCTION COIL MOUNTED DIRECTLY ON THE PIPING WITHOUT AN ACOUSTIC COUPLING

CROSS REFERENCE

This application claims priority to PCT Application PCT/EP2012/000466 filed Feb. 2, 2012, which in turn claims priority to German Patent Application No. 10 2011 015677.1, filed Mar. 31, 2011, each of which is incorporated by reference herein in its entirety.

TECHNICAL FIELD OF THE INVENTION

The present invention relates to an acoustic flow rate meter for the noninvasive measurement of the flow rate or the flow velocity in electrically conductive objects through which media flow, in particular pipes or pipelines, having an excitation transducer for generating at least one ultrasonic wave in the object, which is coupled into the medium on an inner side of the object oriented toward the medium as a wave, in particular as a longitudinal wave, and having a receiving transducer for detecting an ultrasonic signal in the object, wherein the ultrasonic signal at least partially results due to the (longitudinal) wave.

BACKGROUND OF THE INVENTION

Conventional noninvasive flow rate meters must be fixedly clamped onto pipes or pipelines, so that the ultrasound generated by an excitation transducer can be coupled into the pipe. Neither the fixed clamping of the device nor the subsequent operation impair the media transport in the pipe, because of which this is referred to as a noninvasive flow measurement. Often, additional wedge-shaped acoustic couplers are used, which are arranged between piezoelement and object and which couple the acoustic signal output by an excitation transducer, often with additional use of a coupling medium, into the line wall.

Installing and putting into operation the excitation and receiving transducers on the pipe represents a critical work step, since a spacing between excitation and receiving transducers, which is defined depending on the medium, the wall thickness, and the material, for the ultrasonic waves generated in the pipe must be exactly maintained. Even slight deviations from the optimum spacing worsen the signal significantly. In addition, the conventional ultrasonic flow rate meters are only usable in a comparatively narrow temperature range, wherein this means the temperature of the object, preferably a pipe or a pipeline. The operating temperature of the transducer must be significantly less than the Curie temperature thereof, which is typically between 150° and 350° for a variety of employed transducers. A solution for overcoming this problem is described, for example, in DE 4124692 A1, in which the transducer is implemented using a special piezoceramic for high-temperature applications. Flow velocities or flow rates of media in objects having temperatures up to 180° may be measured in this way. In addition to the temperature problems, however, critical problems may sometimes arise because of tensions in the material of the acoustic coupler, which are generated by strong temperature gradients. Furthermore, aging of the coupling medium, which is typically gel-like, used between acoustic coupler and pipe is problematic. The signal quality of the ultrasonic wave generated in the object decreases with increasing age of the coupling medium.

SUMMARY OF THE INVENTION

The object of the present invention is to implement an acoustic flow rate meter for a greater range of use.

It is provided according to the invention that the excitation transducer is implemented as a high-frequency induction coil, while omitting an acoustic coupling of the excitation transducer with the surface of the object, to generate a varying magnetic field in a surface-proximal region of the metallic object and the ultrasonic wave is generated by interaction of the varying magnetic field with a static or quasi-static magnetic field in this region. A surface-proximal region is the region of the object defined by the penetration depth of the eddy currents generated by the high-frequency induction coil.

An acoustic coupling of the flow rate meter according to the invention with the object, for example, a pipeline or a pipe, is not necessary. Excitation and receiving transducers of the acoustic flow rate meter can be arranged spaced apart from the object. In addition to measurements in ranges above 180° C., the flow rate can also be measured through coated objects, for example, pipelines coated using cement or plastic. It is a requirement for this purpose that the coating is permeable to magnetic fields. Removal of a coating of the object, which is required in the prior art, is not necessary.

Although the excitation transducer of a flow rate meter according to the invention can also be in physical contact with the object, it is sufficient if it is positionable in proximity to the object having flow through it. The distances can be in the centimeter range up to 2 cm, for example.

By way of the use of the high-frequency induction coil, a magnetic alternating field is generated in a surface-proximal region of the object. A part of the high-frequency magnetic field generated by the high-frequency induction coil or coils penetrates into the object and induces eddy currents. An ultrasonic wave is generated in the object by interaction of these eddy currents with a static or quasi-static magnetic field as a result of Lorentz forces or magnetostriction.

A quasi-static magnetic field is understood as a magnetic field which can be considered to be static in the calculations in relation to the high-frequency magnetic field. In particular, a quasi-static magnetic field varies at a frequency $\leq 200$ Hz, in particular $\leq 10$ Hz, so that electromagnetically generated magnetic fields can also be considered to be static magnetic fields. The high-frequency magnetic field is an oscillating magnetic field in particular.

In addition to the advantage of being able to measure through existing coatings of a pipe and in a broad temperature range, the device is subjected to less appearances of aging because of a lack of coupling media. A coupling medium, which is to be replaced often in the known prior art, is not required.

A flow rate meter according to the invention is often described in the present case with reference to an object on which or in the near field of which it is arranged. Such an object, which is implemented as a pipe, for example, is not the object of the invention, however, rather, the object of the invention is implemented for operation on such a pipe.

For signal tuning purposes, the frequency at which a transducer can be operated is preferably automatically variable. By way of the variability or adaptation of the high frequency at which the excitation transducer is to be operated, both the ultrasonic wave generated in the object and also the longitudinal wave generated in the medium can be optimally aligned on the receiving transducer. Therefore, tolerances in the spacing of the excitation transducer from the receiving transducer or imprecise positionings, which had to be cumbersomely readjusted manually in the prior art, can be compensated for electronically. This results from the angle dependence of the generated transverse waves, in particular the bulk shear waves (volume shear waves) on the employed frequency, which angle dependence is used for the design of the transducer. Variations of the wave propagation as a result of pressure changes in the pipe or temperature changes can also be compensated for in this manner. The measurement accuracy and the adaptability of the system are significantly improved in relation to the prior art. The high frequencies at which the excitation transducer can be operated are therefore variable to optimize the received signal in such a manner that a longitudinal wave induced in the medium is guided in an optimized manner in the direction of the receiving transducer. In particular, by way of a frequency change, the angle $\varphi 21$ of the induced ultrasonic wave in relation to a perpendicular on the surface of the object and therefore also of the coupling angle at the transition object-medium is settable. This perpendicular is normal, i.e., perpendicular, on an external surface of the pipe in particular in the case of objects implemented as rectangular pipes, wherein the surface lies parallel to an axial direction, which is determinable in particular by a main direction of a media flow.

Advantageously, under the simplifying assumption of waves propagating in a beam shape, the following equation applies for the generation of bulk shear waves:

$$\sin(\varphi 21) = c_{wall}/(f*D),$$

where $c_{wall}$=speed of sound in the object, f=high frequency of the excitation transducer, D=a spacing of adjacent conductor paths having identical current direction, which results from the setup of the transducer.

Preferably, not only the excitation transducer is operable while omitting an acoustic coupling with the object. Rather, in a further implementation of the invention, this also applies for the receiving transducer for detection of the ultrasonic signal. This is also implemented in particular as a high-frequency induction coil. According to one exemplary embodiment, the receiving transducer and also the excitation transducer can transmit and receive. In this way, for example, known methods for measuring the runtime differences, which are used for analyzing flow rate velocities or flow rates, can be implemented on the device according to the invention via only two transducers. The use of only one transducer is also possible.

The device according to the invention is advantageously operated in pulses or bursts. For this purpose, via a high-frequency pulse or burst, the excitation transducer is operated for a small number of periods, preferably fewer than 50 periods, at the high frequency, after which an ultrasonic wave propagates in the object. In particular, the excitation transducer is designed to generate Lamb waves or shear bulk waves, which each generate desired longitudinal waves at the transition object/medium. The longitudinal wave generates, upon incidence on an opposing inner wall of the object, an ultrasonic wave therein in turn, which can be detected with a time delay by the receiving transducer in relation to the ultrasonic wave which is directly generated in the object and relayed in the object wall. Because of the time delay, the signals of the waves may be separated, so that an ultrasonic signal which varies due to the velocity of the medium can be measured. By switching over from excitation and receiving transducer to receiver and excitation transducer and the passage of the medium in the opposing direction, runtime differences between the signal varied by the medium can be measured, which finally permits conclusions about the flow velocity and the rate.

Instead of switching over, two additional coils may also be used, one of which is arranged as a receiving transducer close to the excitation transducer and the other of which is located as an excitation transducer close to the receiving transducer. In particular, the conductor paths of the coils arranged close to one another can be arranged adjacent to and/or one above another. During a measurement using switchover transducers, the switchover frequency is in a range of 10 Hz to 200 Hz, preferably in a range between 50 Hz and 100 Hz. A very high measurement accuracy may be achieved by the multiplicity of the measurements.

In a further implementation of the invention, a flow rate meter according to the invention is additionally implemented to generate a static or quasi-static magnetic field, which can be aligned along an axial direction of the object or normal thereto. For this purpose, the flow rate meter can have a permanent magnet and/or an electromagnet. While the use of a permanent magnet is less technically complex, the use of an electromagnetic may be used in particular for automatic amplitude adaptation. An electromagnet can be produced, for example, by wrapping the object, for example, a spiral wrapping of a pipe, or implemented by pole shoes, which are wrapped by conductors to which current can be applied, made of ferromagnetic material.

Preferably, to optimize the measuring signal, the conductor path of the high-frequency coil is to be aligned for the intended application perpendicularly to the longitudinal axis and in the circumferential direction of the object, i.e., the setup of the acoustic flow rate meter is configured for pipes, for example, so that the conductor path or also conductor paths of the high-frequency coil extend substantially perpendicularly to the longitudinal axis of the object. In this way, a longitudinal wave coupled into the medium, in the case of a pipeline or pipe which is round in cross-section, will always intersect the longitudinal centre axis (pipeline axis) thereof. For meandering high-frequency coil conductor paths provided according to the invention, this means that the longer sections thereof are aligned perpendicularly to the longitudinal axis, wherein narrow transitions between conductor paths running back and forth are negligible. In particular, the conductor paths can be implemented as a winding, wherein the induction coils can then be "classical" wound coils.

A transducer of the device according to the invention, which functions as an excitation transducer, is preferably designed for generating "bulk" waves, i.e. volume waves, in particular shear bulk waves. For non-ferromagnetic, but electrically conductive materials, the transducers are in turn designed for generating bulk longitudinal waves.

A particularly uniform through transmission is achieved if the excitation transducer is designed for generating Lamb waves of the nth order, wherein n is an integer and is ≥0. The use of zero-order or higher modes, in particular modes of the order n=0, 1, or 2 has been shown to be suitable in particular for flow rate measurements of aqueous, oily, and gaseous media and to be appropriate for significant formation of longitudinal waves. Desired optimal modes may be set by the frequency tuning of the transducer.

For smaller, in particular tubular objects having diameters of preferably less than 5 cm, the transducers can intentionally be designed to generate guided waves in the form of flexural waves.

The layout of the transducer is understood in particular as the frequency thereof to be set and the arrangement of the static (or quasi-static) magnetic field and the arrangement of the conductor path or conductor paths. The setting of the high frequency of the transducer to generate Lamb waves or shear waves is performed in particular depending on the thickness of the wall of the object in which the ultrasonic wave is to be generated.

An acoustic flow rate meter can generally have, in addition to an excitation transducer and a receiving transducer, a device for magnetizing the object as described above, electronics for the excitation, and receiver electronics, including signal analysis. Excitation and receiving transducers can also be implemented by a single high-frequency induction coil. The flow rate meter can also have interfaces for connecting individual power supply units, computers, or other recording or display units.

The high-frequency coil is advantageously operable in a frequency range from 20 kHz to 50 MHz, preferably between 50 kHz and 3 MHz, for the generation of the ultrasonic wave. In particular for wall thicknesses less than 1 mm, frequencies between 3 MHz and 50 MHz are advantageous, while for typical wall thicknesses of 1 mm to 10 mm, frequencies between 20 kHz and 3 MHz are advantageous. In this range, the excitation of ultrasonic waves is possible in particular at magnetic field strengths in a range from 5 kA/m to 20 kA/m for a variety of ferromagnetic or steel-containing pipeline materials.

For improved generation of an ultrasonic wave in the object, in a further implementation of the invention, the side of emitter and/or receiving transducers to be oriented toward the object is implemented as curved, so that it can be led completely or at a slight, uniform spacing to a pipe outer wall or the coating thereof, which is provided with a curvature. The goal for this purpose, in the case of contact on or arrangement close to an object, to obtain an alignment of the side of the transducer and therefore the conductor paths of a transducer, which typically extend parallel to the side, which is at least substantially parallel to the surface of the transducer.

Excitation and receiving transducers can be implemented in a further improved embodiment to be applied to the pipe and/or even to be wrapped around the pipe. In such a case, for example, pipes can be wrapped or enclosed to implement a stationary flow rate meter. In the event of complete wrapping, ultrasonic waves can be generated along the entire periphery of the pipe, whereby longitudinal waves around the entire periphery can be coupled into the medium and the entire pipeline cross-section can be transmitted through. Since due to the coupling from all sides and the propagation of the longitudinal waves to the opposing side the inner free pipeline cross-section is covered twice, half-wrapping of the pipe using a high-frequency induction coil can already be sufficient for acquiring the complete pipeline interior.

Emitter and/or receiving transducers are preferably implemented by means of conductor paths to be wound or laid around the object, which allows a cost-effective and simple construction of the device and simultaneously allows complete detection of an object periphery. In this way, in contrast to the prior art, coverage of the entire inner free pipeline cross-section is possible. The curvature of the conductor paths is preferably variable to increase the adaptability. In addition, by complete, and in particular multiple wrapping of an object, the influence of interfering edge waves is minimized as a result of short transition sections of meandering conductor paths. A 360° wrapping of an object, which is free of edge effects, by the conductor path results in avoidance of interfering signals.

The adaptability of a flow rate meter according to the invention is further increased if excitation and receiving transducers are implemented as at least partially flexible, i.e., for example, bendable, to be adaptable to different object external diameters and object shapes. Preferably, in this case this relates to a film provided with an electrical conductor or a flat band cable, which can be wound at least partially around a pipe, for example. A holding device of the flow rate meter can have arms, which receive two respective sides of the film or the flat band cable and are pivotable in relation to one another, for this purpose. In particular known and often cost-effective flat band cables, which typically have a higher temperature resistance than films, are usable.

The conductor paths of a high-frequency induction coil, for example, in a film, can be implemented as meandering. They can also be able to be wound around the pipe in a spiral. In this case, meandering means an implementation by which the current directions of the respective adjacent and in particular parallel conductor path sections (in the peripheral direction of the object to be checked) are oriented in opposite directions. For example, the conductor path or conductor paths are a multicore flat band cable, the conductors of which are connected to one another at the ends such that the current directions of adjacent conductor paths alternate.

A flow rate meter according to the invention is provided in particular with two pairs of excitation and receiving transducers, so that without switching over a transducer from excitation transducer to receiving transducer, transmission can be performed between the pairs. For this purpose, the conductor paths of the transducers of the respective pairs are preferably arranged close to one another in parallel and in particular laid one over another or adjacent to one another.

For complete coverage of the free pipe or object interior, through which the medium flows, it is sufficient as described above if excitation and receiving transducers are positionable on opposing sides of a pipe and respectively cover 180° of the pipe outer periphery. Complete coverage of the free cross-sectional area in the pipe is possible in this manner.

For simple positioning of the excitation and receiving transducers, they can have pivotable arms which are connected to one another, via which clamping on the object can be carried out.

Advantageously, in the case of the use of a flow rate meter which covers the entire free interior of the pipe, the analysis unit is implemented for the detection and/or size determination of bubbles in the fluid, i.e. in particular gas bubbles in a liquid medium. For this purpose, for example, monitoring and analysis of the signal amplitude can determine not only the presence of bubbles, but rather also the size of bubbles, which may be retrieved as amplitude attenuations in the analysis signal.

In a preferred setup of the flow rate meter for generating Lamb waves, it is additionally implemented to measure the wall thickness (preferably by analysis of the dispersion curves) and/or the pressure of the medium on the basis of the ultrasonic signal, so that the received flow signal can be automatically optimized in the event of changing boundary conditions. For the pressure measurement, in particular the dependence of the speed of sound on the pressure can be used. Speed of sound variations may be readjusted with the aid of the frequency adaptation. Under the presumption of constant other parameters such as the temperature, the set frequency is a measure of the pressure.

Measurements of an object which is hotter than 180° C., preferably an object hotter than 350° C., can be carried out already by way of the slight spacing of a few millimeters, which is possible as a result of the implementation according to the invention and the mechanical decoupling accompanying this of the flow rate meter according to the invention from the object. In addition, excitation and receiving transducers are implemented as heat resistant by means of corresponding materials in such a manner that they are implemented for preferably contactless measurement of the flow rate in an object hotter than 180° C., preferably an object hotter than 350° C.

While a device according to the invention is preferably portable by a single operator and is therefore not heavier than 50 kg, preferably not heavier than 25 kg, the flow rate meter can also be constructed modularly in a further implementation of the invention. This is to be understood as a flow rate meter or measuring device, the emitter and/or receiving transducers of which are permanently positionable on an object and which are connectable to an activation and analysis unit, which is portable by the operators in particular, for measuring the flow rate, wherein in addition the flow rate meter can have a device for generating a static or quasi-static magnetic field.

Thus, for example, conductor paths on pipes or conductor paths wound around pipes can remain and the effort for a rapid measurement on a variety of already wrapped pipes is substantially decreased in relation to the prior art.

These aspects are merely illustrative of the innumerable aspects associated with the present invention and should not be deemed as limiting in any manner. Further advantages and details of the invention may be inferred from the following description of the figures.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention. Identical or similarly acting parts are provided—if useful—with identical reference signs. Individual technical features of the exemplary embodiments described hereafter can also result in refinements according to the invention with the features of the above-described exemplary embodiments.

Figure 1:
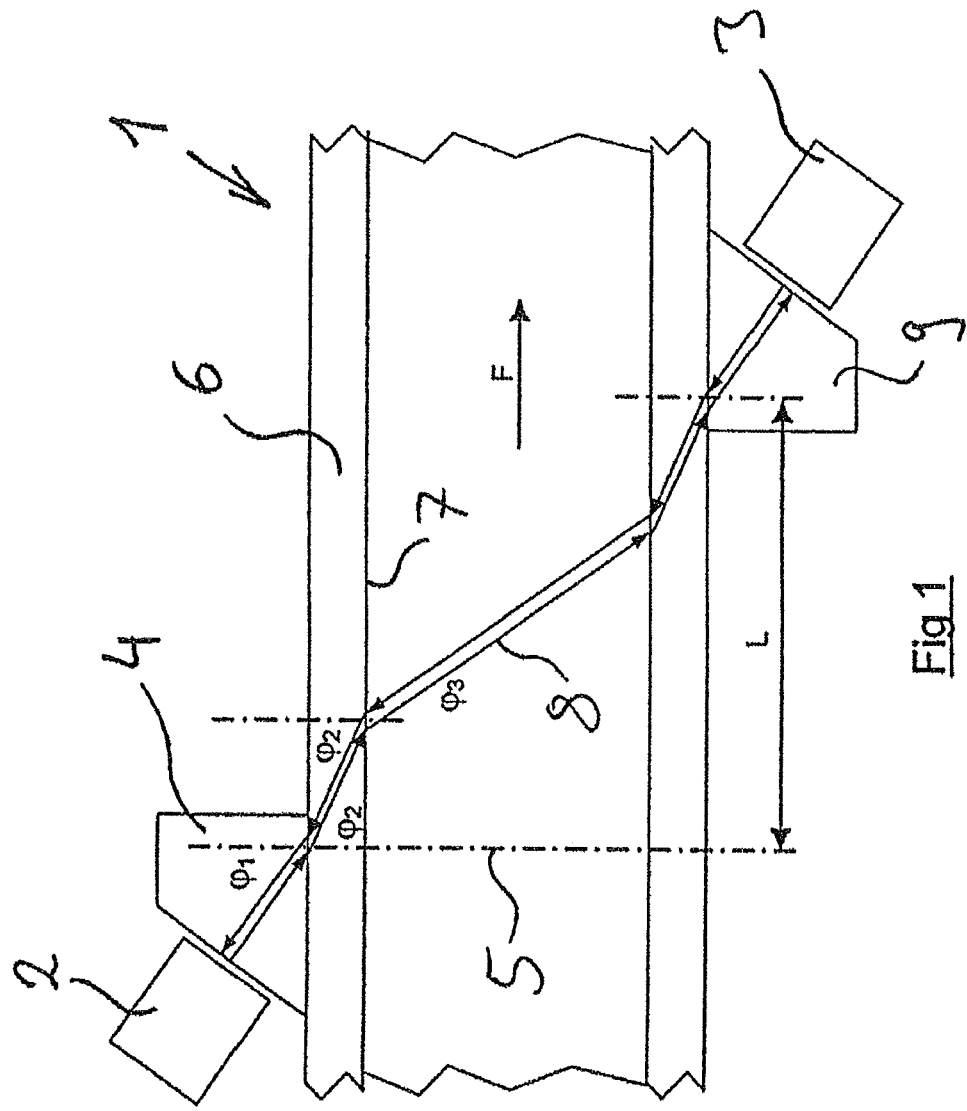
FIG. 1 shows a sectional illustration of a flow rate meter according to the prior art.

FIG. 1 shows a setup known from the known prior art for measuring the flow F of a medium, in particular a gas or a liquid, in a pipe 1 illustrated in section. A piezoelectric ultrasonic transducer 2 can act, like a piezoelectric ultrasonic transducer 3, both as an excitation transducer and also as a receiving transducer. Originating, for example, from the excitation transducer 2, an ultrasonic signal is coupled via a wedge-shaped acoustic coupler 4 at an angle $\phi 1$ (measured in relation to a perpendicular 5 to the pipe surface) into the pipe wall 6. Under the assumption that the ultrasonic wave propagates in a beam shape in the pipe wall 6, the wave reaches the pipe inner side 7 and is coupled into the medium there at an angle $\phi 3$. Therein, the sound wave coupled in as a longitudinal wave 8 is varied by the flow of the medium and reaches the lower inner side of the pipe wall in the figure. With respect to the peripheral direction of the pipe inner wall, it is a side of the pipe inner wall opposite to the coupling point, which is axially offset as a result of the wave vector component pointing in the direction F. At this lower side, coupling again occurs into the pipe wall 6 toward a further acoustic coupler 9. The ultrasonic signal influenced by the medium reaches the transducer 3, which functions in this case as the receiving transducer, through this further acoustic coupler. In a further operating mode, the receiving transducer 3 is then active in a next step as an excitation transducer and emits an ultrasonic wave via the coupling means 9 in the direction of the transducer 2, which now functions as a receiving transducer. It is apparent that for a functioning construction in the case of this setup, the spacing L of the transitions of the ultrasonic signal between coupling means 4 or coupling means 9 and the pipe wall 6 is important. Slight deviations in the spacing of the two acoustic couplers from one another result in an attenuation or a complete loss of the signal and thus a worse or even no measurement result.

Figure 2:
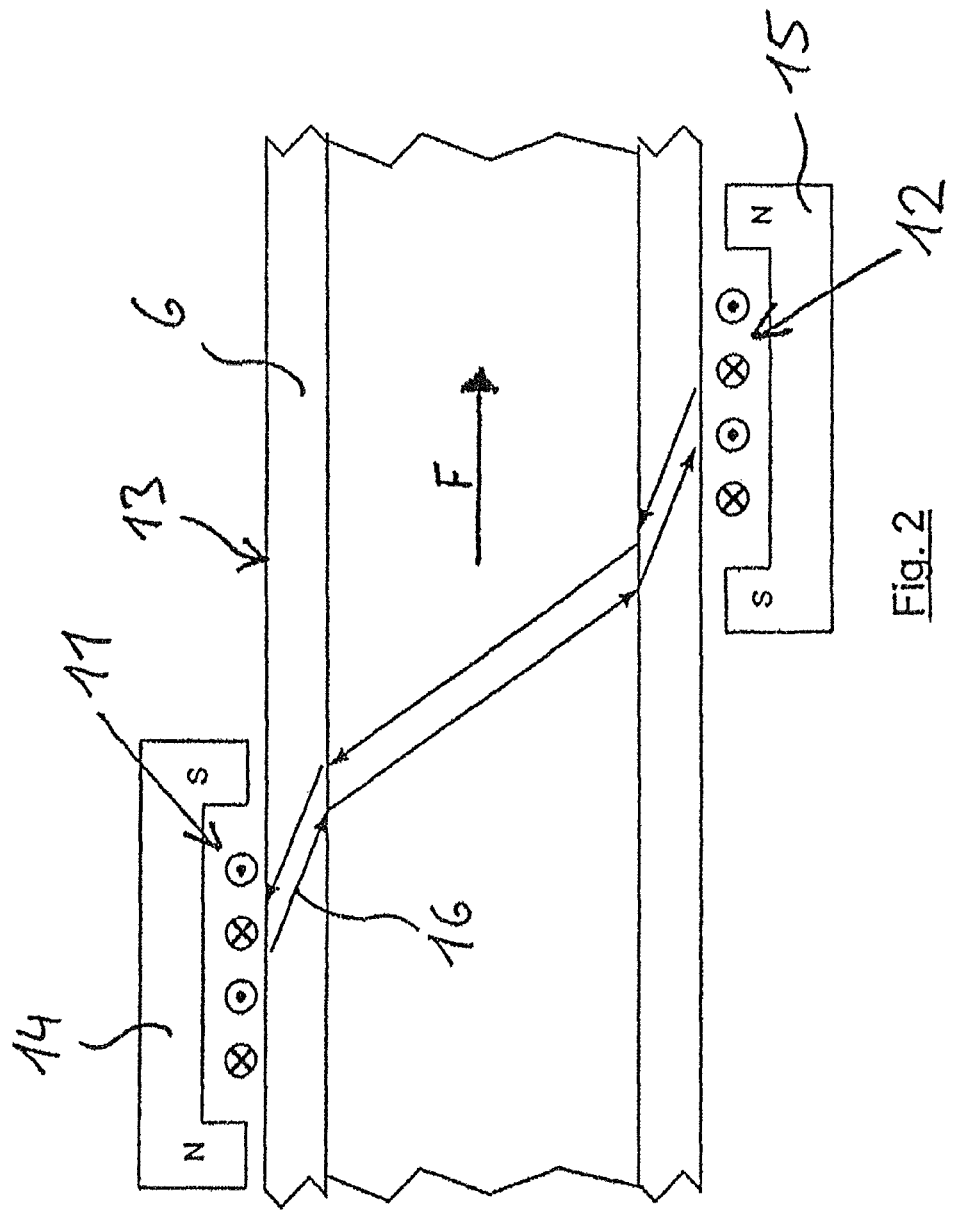
FIG. 2 shows a part of the object according to the invention in a view according to FIG. 1.

FIG. 2 shows an acoustic flow rate meter according to the invention (in parts), which shows, in addition to a first transducer 11 functioning as an excitation and receiving transducer, a further transducer 12 functioning as an excitation and receiving transducer. Both transducers 11 and 12 are implemented as high-frequency induction coils. Both high-frequency induction coils 11 and 12 can induce eddy currents in a region of the pipe wall 6 close to the outer surface 13. These eddy currents interact with a static magnetic field, which is generated in the pipe wall 6 in the present exemplary embodiment of FIG. 2 by two permanent magnets 14 and 15 similar to pole shoes. Ultrasonic waves oriented into the pipe wall arise due to the interaction. Such an ultrasonic wave 16 is implemented as a volume shear wave, for example, and is coupled into the medium flowing in the direction of the flow F. On the opposite side of the pipe inner wall, the longitudinal wave is coupled back into the pipe inner wall and can be detected there by the high-frequency induction coil 12, which then functions as the receiving transducer. The device can be operated using various setups for the high-frequency induction coils 11 and 12 and also using various setups with respect to the magnets 14 and 15, as described above and hereafter.

As already indicated in FIG. 2, the use of a coupling medium is not necessary. In this way, the installation of the transducers in proximity to the pipe or also on the pipe is simplified. Measurements can also be made on very hot pipes due to the possible spacing or the use of thermal-insulation layers between excitation and receiving transducers and the pipe 6.

Figure 3:
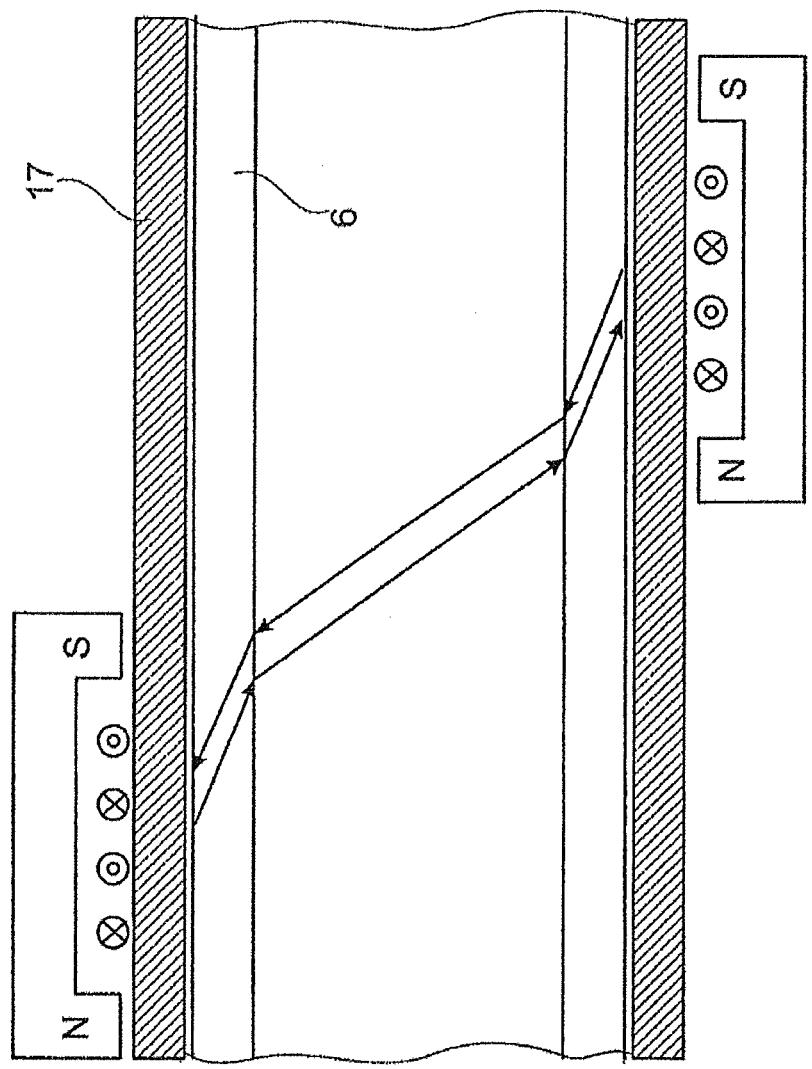
FIG. 3 shows the application of the object according to the invention in the case of a coated object, FIGS. 4a, b show a part of a further object according to the invention.

A schematic illustration of a measuring construction for a pipe 6 provided with a coating 17 is shown in FIG. 3. The coating does not have to be removed to generate the ultrasonic wave in the pipe 6, as is necessary in the prior art. Therefore, the measurement of the flow through coated pipes can be carried out in a simplified manner.

Figure 4:
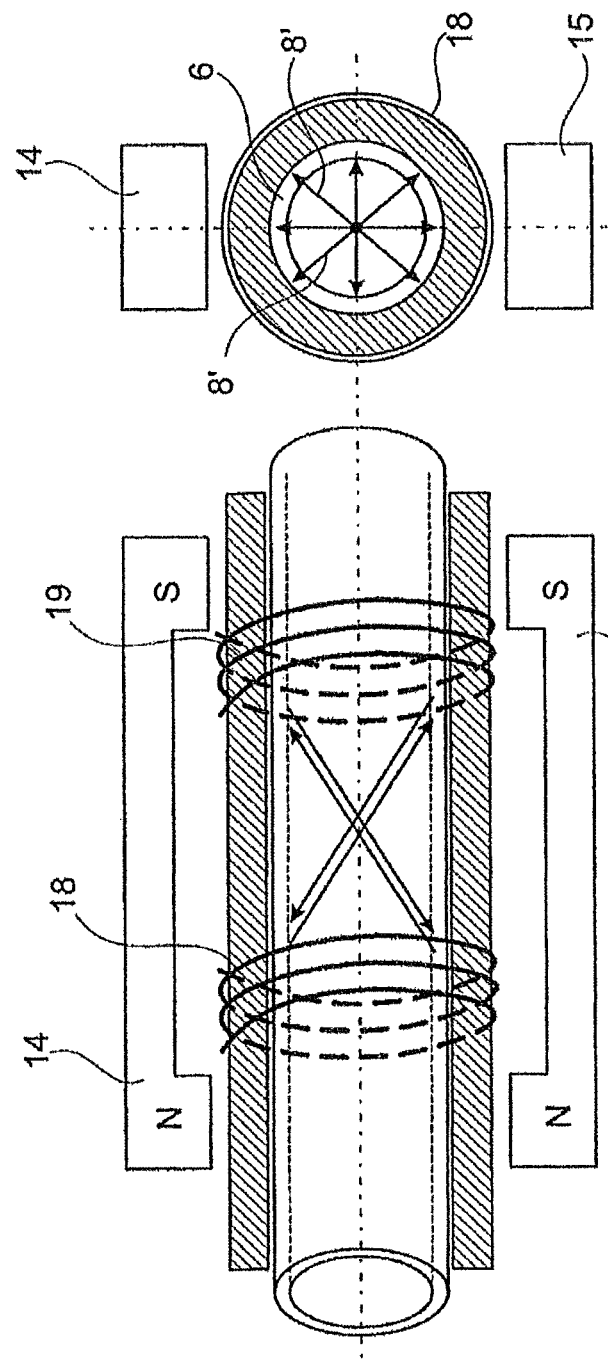

Excitation and receiving transducers can be implemented as flexible transducers, for example, by means of an electrical conductor, which can be wound around a coated pipe, for example, according to FIG. 4a. According to FIG. 4a, a flow rate meter according to the invention has two emitter or receiving transducers, which comprise conductor paths 18 and 19, which cover the free pipeline cross-section twice as a result of the complete wrapping thereof around the pipe. Thus, waves can be coupled into the medium, which waves run to the opposite side, in the pipe along the entire periphery (see FIG. 4b) from the pipe inner side. In FIG. 4b, this is visualized by a total of four double arrows 8'. The complete coverage increases the measurement precision in relation to discontinuous, discrete measuring arrangements, as are known in the prior art, and is suited in particular for turbulent flows. In addition, because of the complete coverage, reliable detection and even a calculation of the size of gas bubbles can be performed.

The two transducers 18 and 19 are overlapped in the setup according to FIG. 4a by two magnets on the side thereof facing away from the pipe, which magnets induce a magnetization in the entire pipeline cross-section. The magnets can also enclose the entirety of the periphery of the pipe. In the case of larger pipe cross-sections, multiple magnets can also be arranged around the pipe in the peripheral direction.

Figure 5:
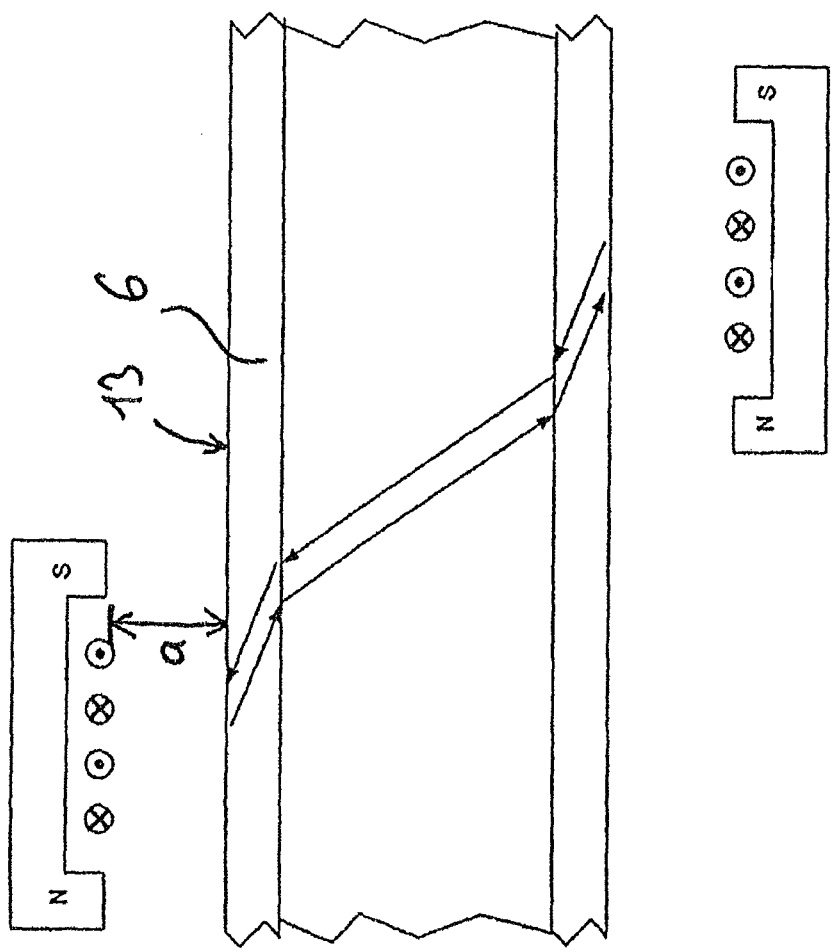
FIG. 5 shows an illustration of a further application of an object according to the invention.

FIG. 5 illustrates the advantage according to the invention of carrying out a reliable flow rate measurement in pipes 6 hotter than 180° C. For this purpose, the spacing a between the outer surface 13 of the pipe and the transducer or the flow rate meter is preferably between 0.1 cm and 5 cm, in particular between 0.1 cm and 1 cm.

Figure 6:
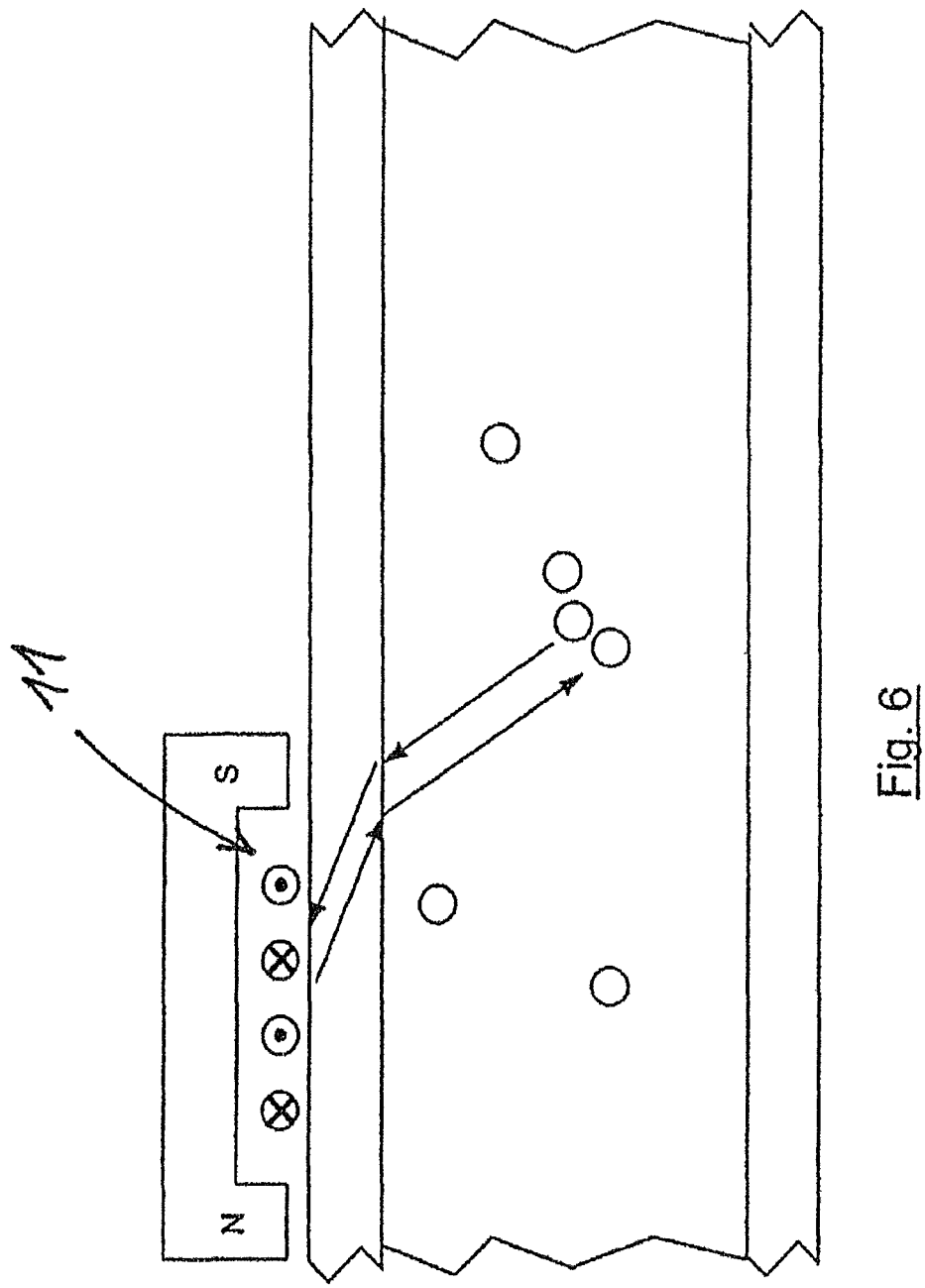
FIG. 6 shows a further object according to the invention in a partial view.

While in FIGS. 2 to 5, the time delay between ultrasound waves extending along opposing paths was analysed, in FIG. 6, a setup of a further device according to the invention is shown, in which analysis is carried out according to the Doppler principle. In this case, the device is provided with only one transducer in the form of a high-frequency induction coil, which functions both as an excitation transducer and also as a receiving transducer. This transducer is capable together with the analysis electronics of measuring frequency changes (Doppler effect) of a reflected ultrasonic wave as a result of moving particles.

Figure 7:
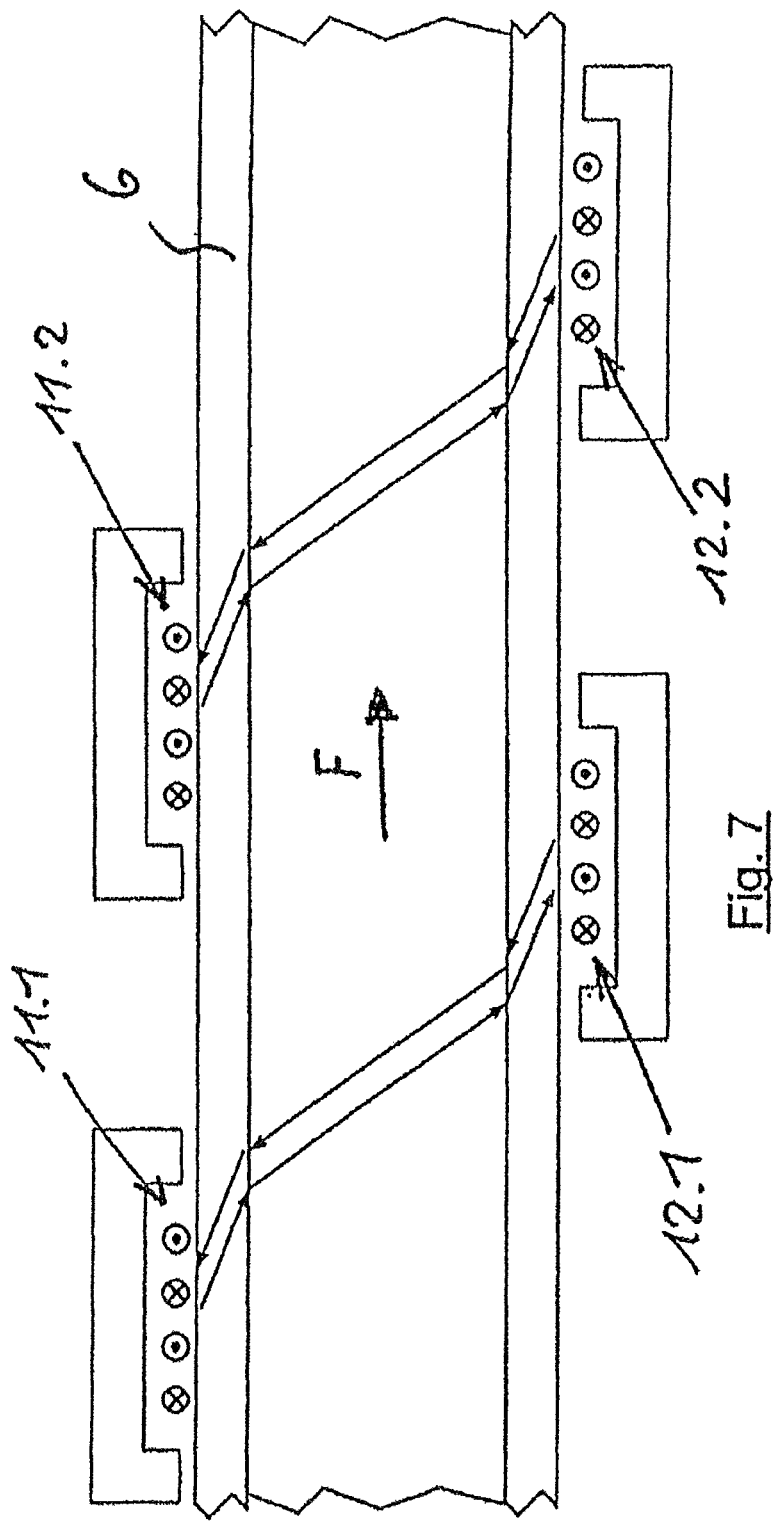
FIG. 7 shows a further object according to the invention (in a partial view)

In particular for turbulent flows, a measuring method and a setup according to FIG. 7 suggest themselves. In this case, in particular for turbulent flows, it is presumed that the turbulent structures thereof do not change within a specific distance (so-called correlation length). An excitation transducer and a receiving transducer are respectively arranged spaced apart in the longitudinal direction of an object, also a pipe again here. The signature of the turbulent flow is measured by both transducer pairs 11.1, 12.1 and 11.2 and 12.2 and a time delay is determined via a cross-correlation signal analysis. This time delay is a measure of the flow velocity F or the transport rate of the medium.

FIGS. 8 to 12 show an array of different windings or setups of the high-frequency coil or coils. Advantageously, these are produced from a flexible conductor and may press against the outer periphery of the object while enveloped in a flexible film, for example. A flexible high-frequency induction coil therefore has the advantage that it is adaptable to a variety of different pipe diameters.

Figure 8:
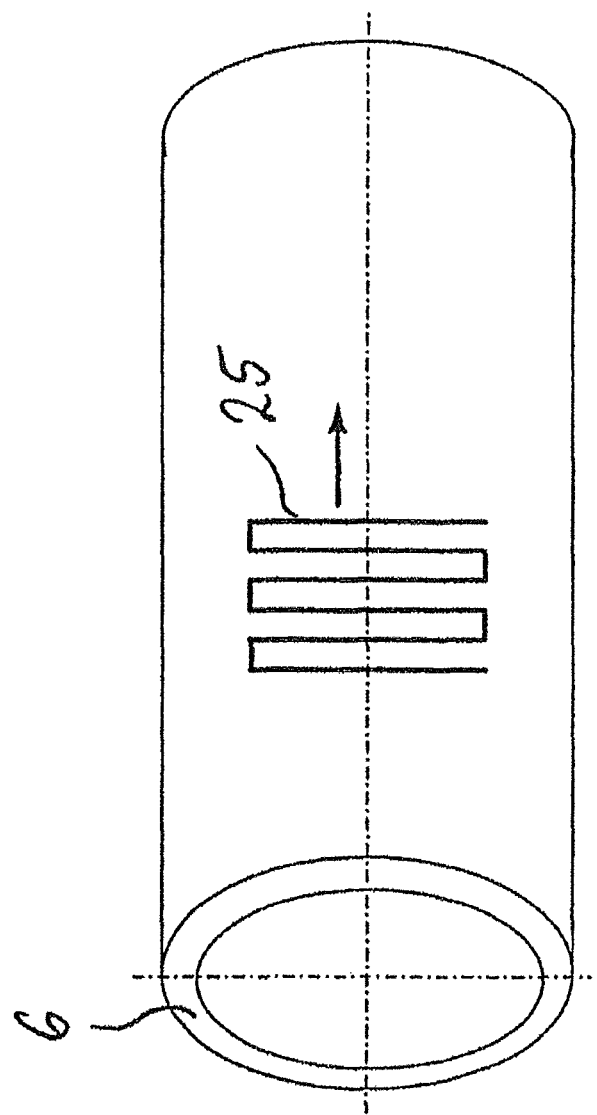
FIGS. 8 to 12 show configuration possibilities of the emitter or receiving transducer of an object according to the invention.
Figure 9:
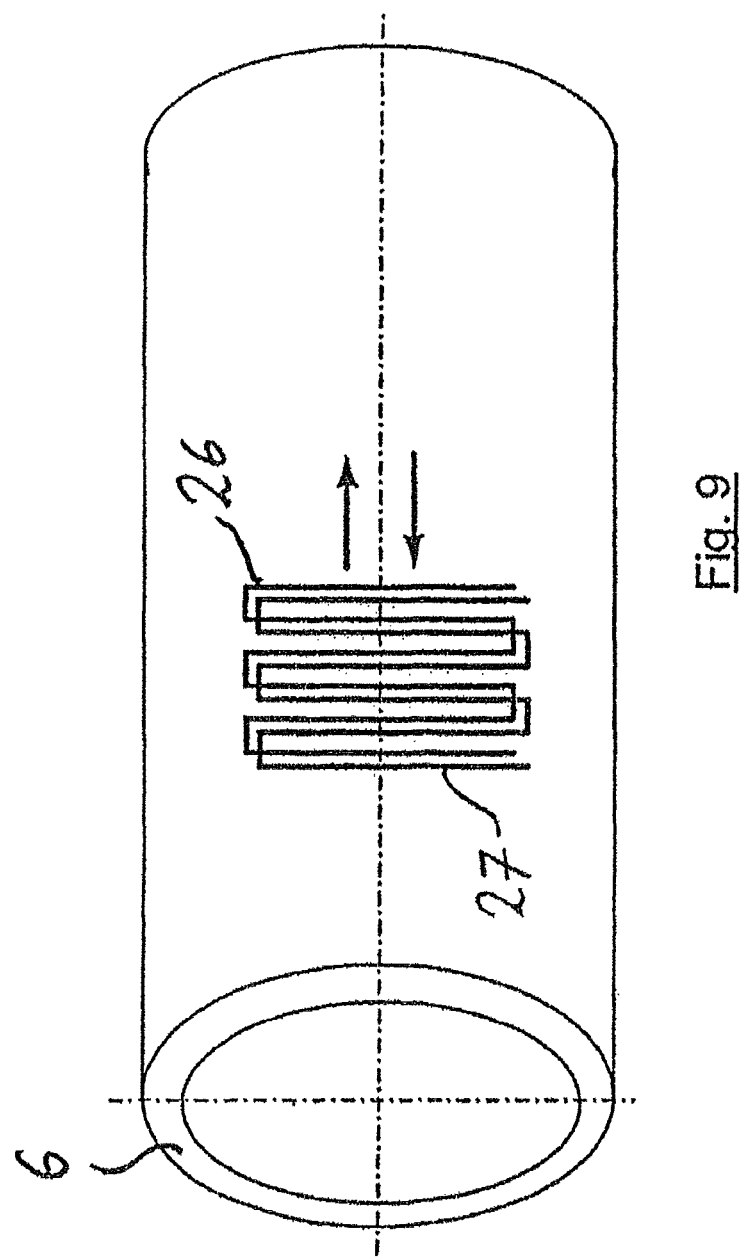
Figure 10:
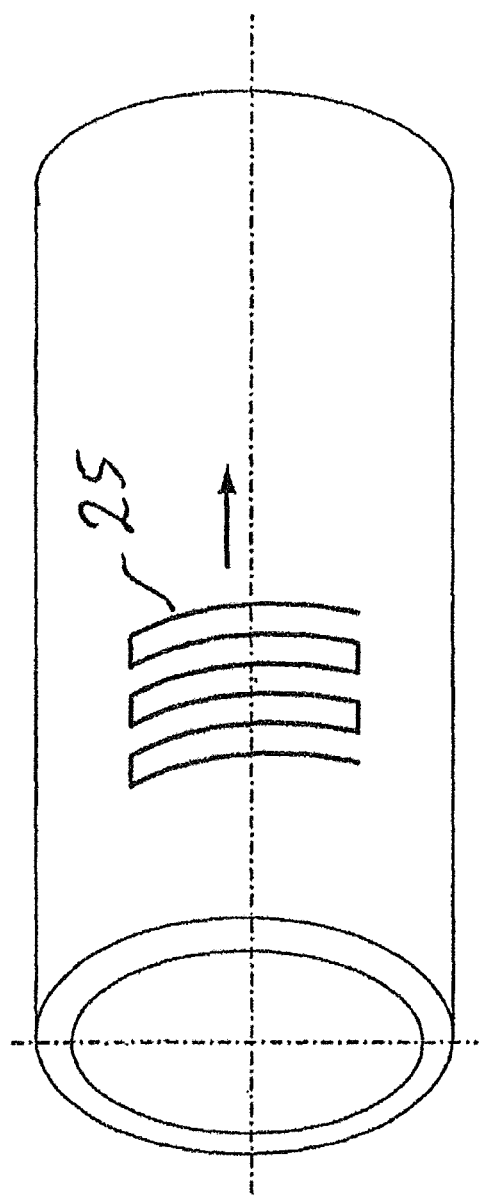
Figure 11:
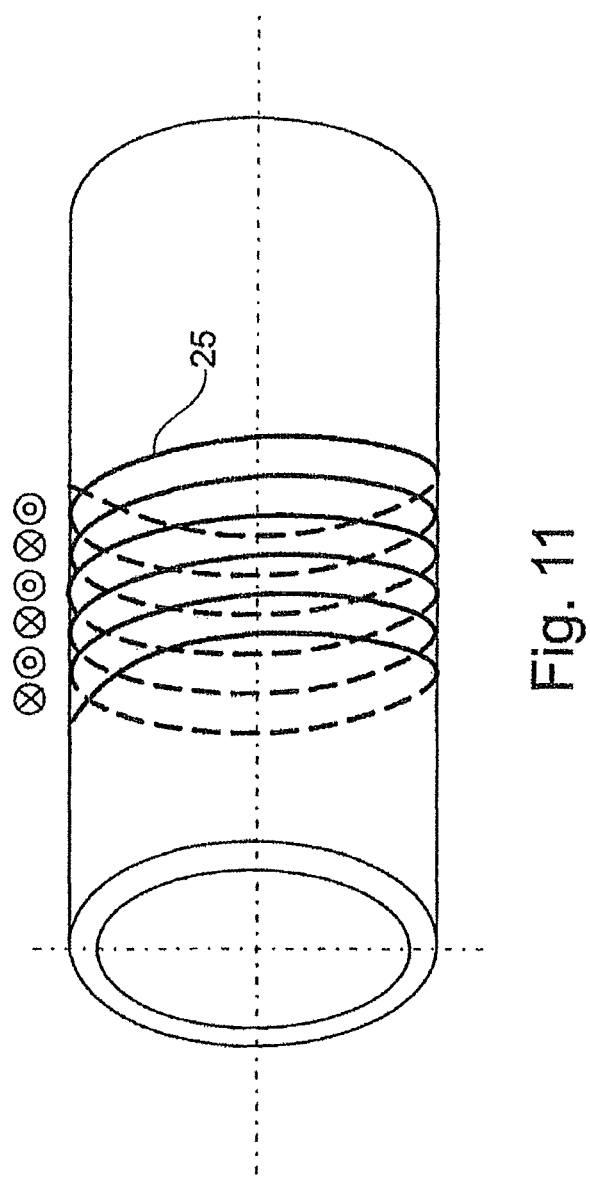

A transducer can be implemented to cover the entire periphery of a pipe, as is shown in FIG. 11, for example. In this case, the individual turns or conductor path sections of a conductor path 25 of the high-frequency coil are laid against one another in meandering form, so that the current directions indicated above the pipe result. A similar transducer is shown in FIG. 8, wherein this transducer can extend only over a partial periphery of the pipe, however, similarly to that in FIG. 10. In contrast to that of FIG. 8, the transducer is adapted to the curvature of the pipe in FIG. 10. In FIG. 8, this is a transducer which is not adapted to pipes which are circular in cross-section in this case.

A superposition of two conductor paths 26 and 27 (FIG. 9) can also be used for the construction of a compact flow rate meter. Excitation and receiving transducers are fastenable in a nearly identical pipe region having conductor path sections parallel to one another and implement a pair of excitation and receiving transducers. A flow rate meter according to the invention preferably has two identical emitter/receiving transducers, wherein the implementation of the conductor paths does not necessarily have to correspond to that of FIG. 9. Rather, in this case these can also be the conductor paths shown in the further figures.

In general, a change of the current direction of the eddy currents in the axial direction is caused by a meandering shape of the conductor path, which results in the implementation of an ultrasonic wave coupled at an angle into the pipe and therefore partially in the axial direction thereof. Dashed sections in the figures show the course of the conductor paths on the non-visible side of the object. Instead of a meandering course of the conductor path, a periodically alternating static or quasi-static magnetic field can also be used, which is generated, for example, by permanent magnets alternately placed against one another having N-S and S-N alignment.

Figure 12:
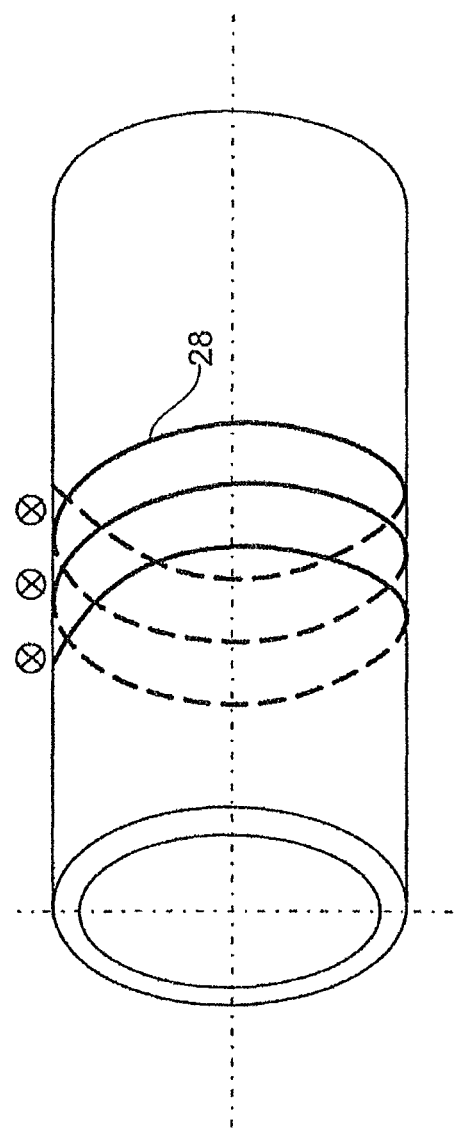

According to FIG. 12, a single conductor 28 is wound in a spiral and not meandering around the pipe, wherein the spacing during the winding and therefore the spacing of the individual conductor path sections lying adjacent to one another is advantageously sufficiently large that the eddy current regions excited by the individual turns are implemented having eddy currents of lower amplitudes.

FIGS. 13 to 16 show setups of flow rate meters according to the invention (shown schematically and in turn partially) having different configurations for the magnetic field generation. This is implemented either perpendicularly to the surface of the pipe or axially to the object.

Figure 13:
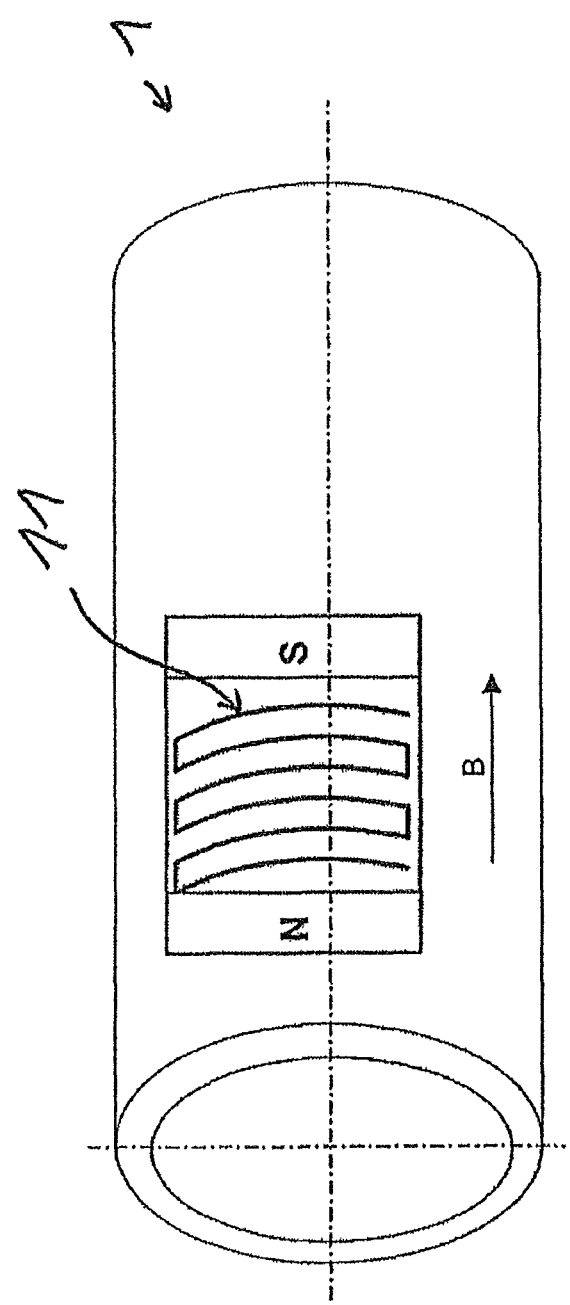
FIGS. 13 to 16 show setups of various objects according to the invention, which differ with respect to magnetic field generation.
Figure 14:
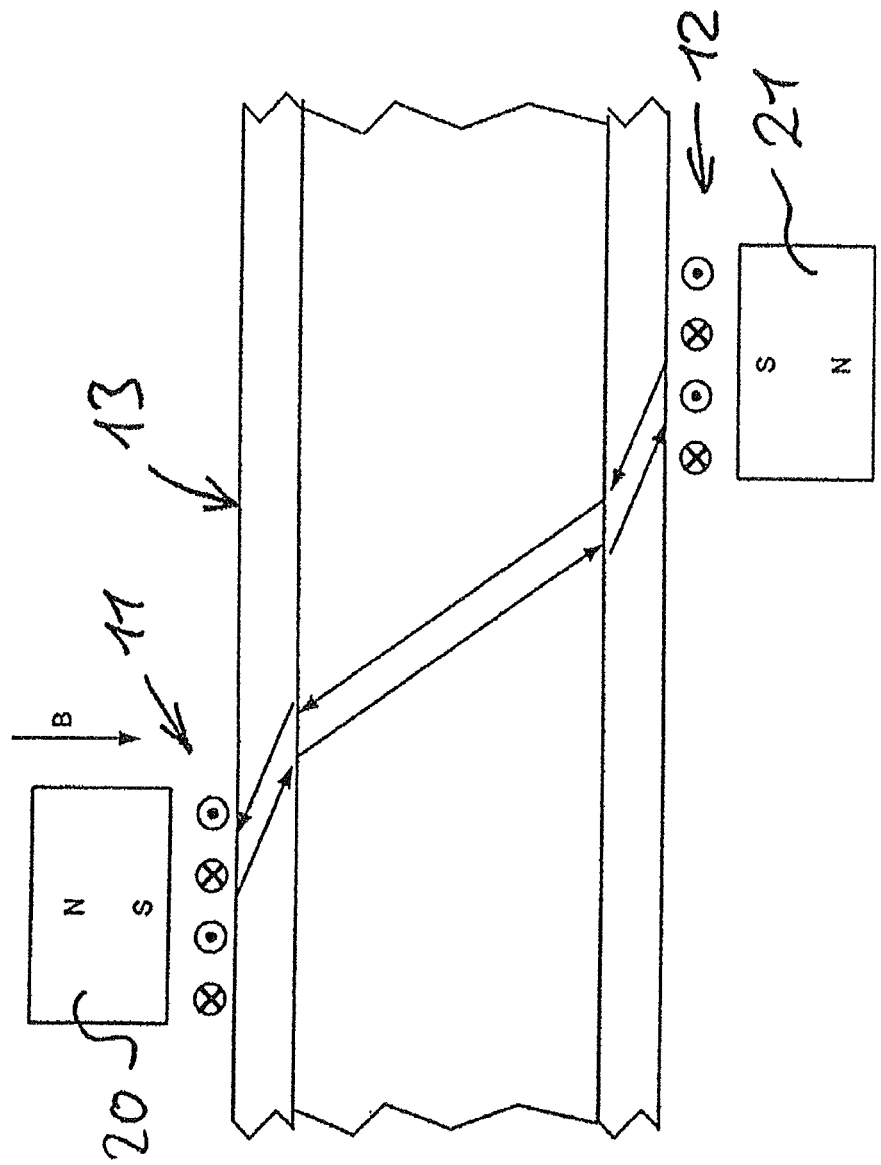

In the exemplary embodiment of FIG. 13, an excitation transducer 11 is located in a magnetic field B, which is generated by a permanent magnet and is aligned in the axial longitudinal direction of the pipe 1. Alternatively thereto, in FIG. 14, a configuration of a flow rate meter according to the invention is shown, in which the applied magnetic field B is aligned perpendicularly to the surface 13 of the pipe 1. The south poles of the two permanent magnets 20 and 21 point toward the outer surface 13 in this case. The excitation and receiving transducers 11 and 12 are arranged between the permanent magnets 20 and 21 and the pipe surface 13. Both an alignment of the magnetic field parallel to the pipe and also an alignment perpendicular thereto can also be generated by an electromagnet of the flow rate meter.

Figure 15:
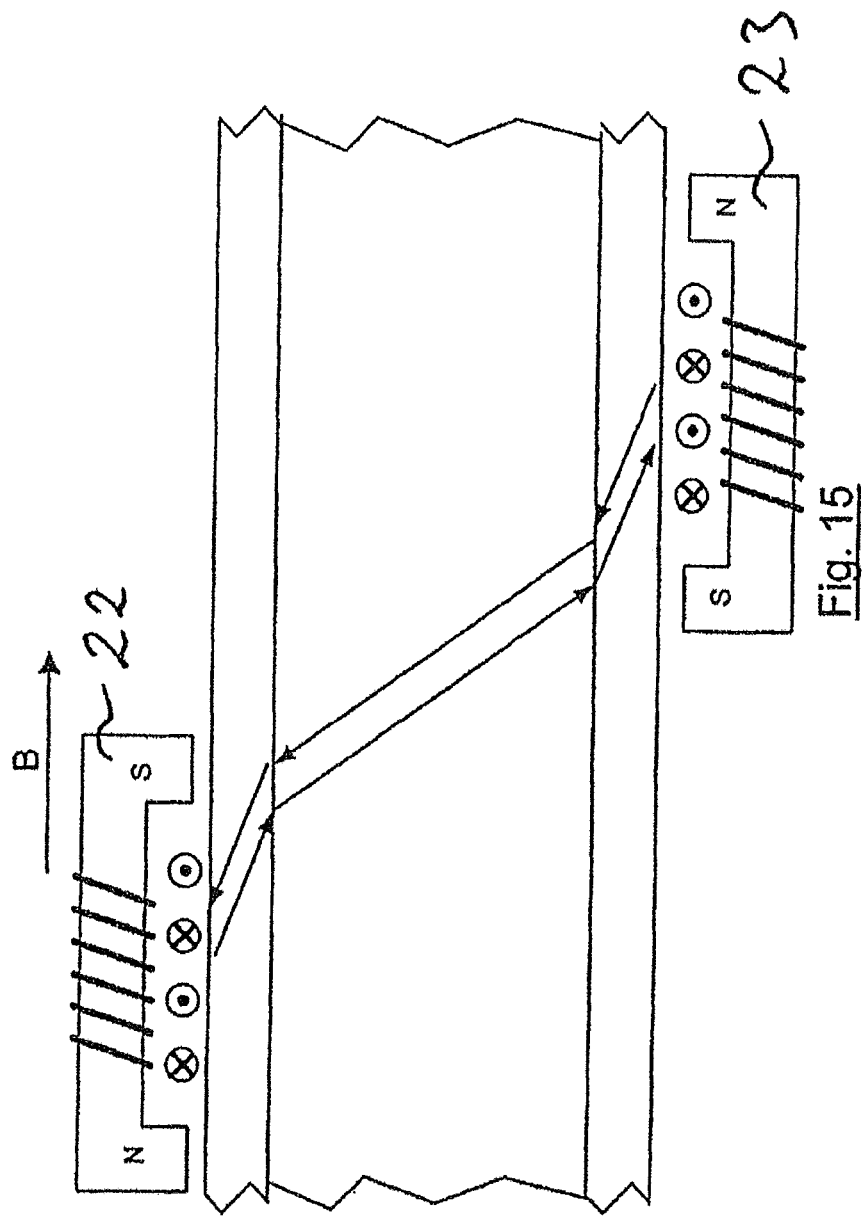

FIG. 15 shows such an alignment, in which a magnetic field aligned in the pipe longitudinal direction is generated by means of two electromagnets 22 and 23. The magnetic field is accordingly implemented in the longitudinal extension of the electromagnets.

Figure 16:
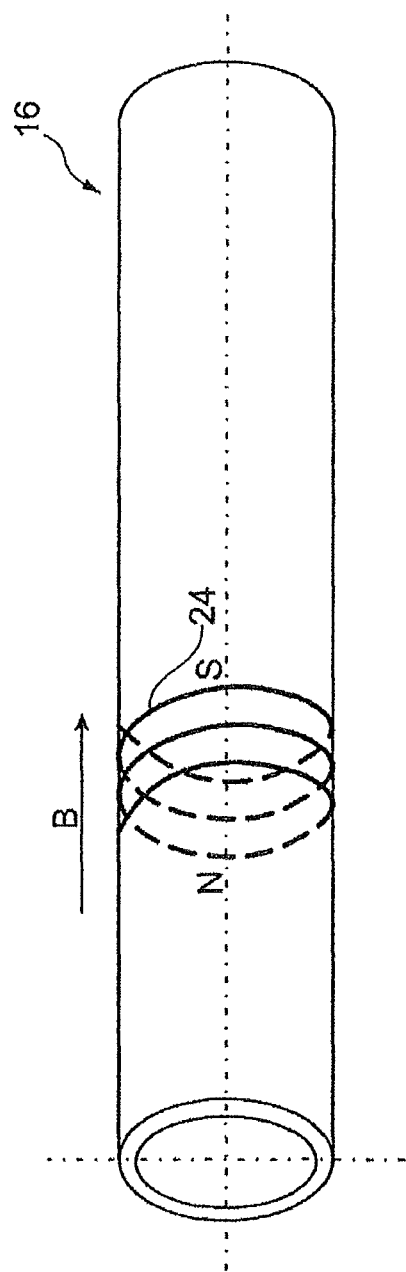

A further implementation of an electromagnet is shown in FIG. 16. In this case, it is a conductor 24 which can be wound around a pipe 1, for example, and to which a direct current or low-frequency alternating current is accordingly applied. The high-frequency induction coils can be arranged between pipe and magnet in such a case as in FIG. 15 and framed between the poles of the magnets. They can also simply be wound over the windings of the conductor 24 visible in FIG. 16.

Figure 17:
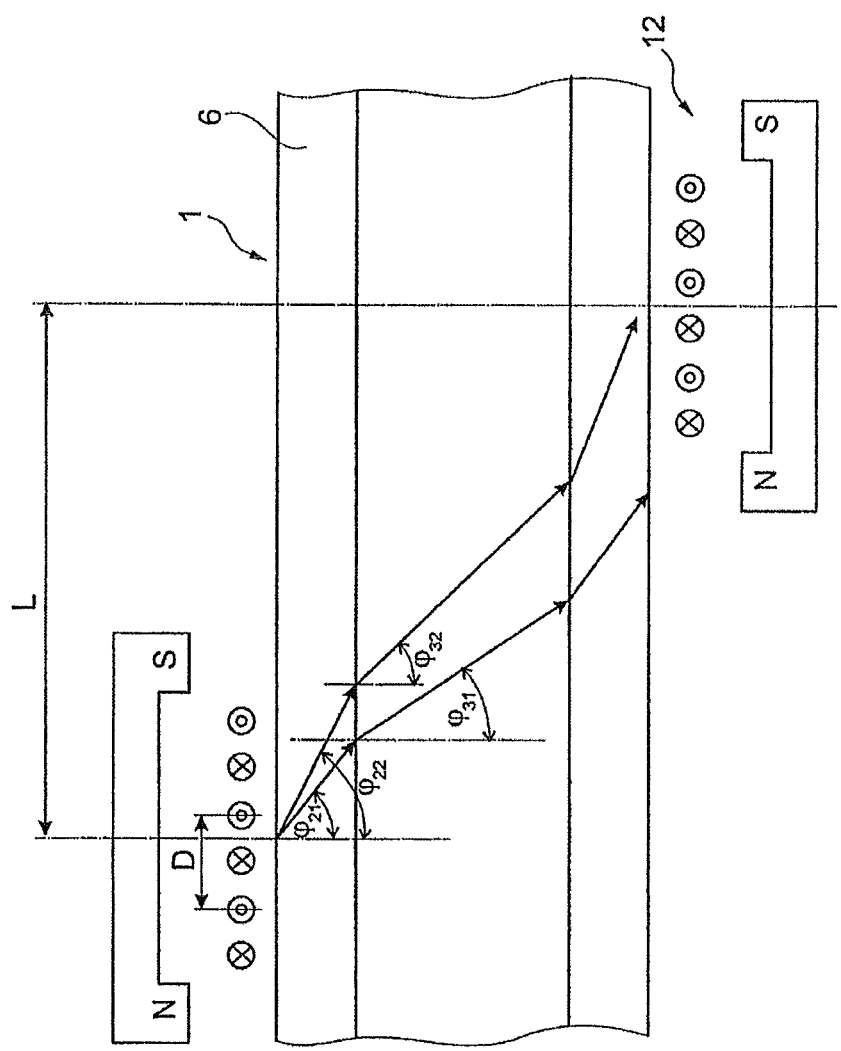
FIG. 17 shows a schematic illustration of an object according to the invention having an automatic adaptation.

According to the invention, an acoustic flow rate meter is implementable in such a manner that varying spacings L between the coupling points into an object, for example, the pipe 1 shown in FIG. 17, can be compensated for automatically and electronically.

Exact positioning of the transducer is not necessary, the adaptation is performed via the adaptation of the frequency at which the transducers are operated. FIG. 17 shows individual paths of the ultrasonic waves for two different frequencies f1 and f2. The wave generated at a frequency f1 is coupled at an angle $\phi 21$ into the pipe wall 6 and further at an angle $\phi 31$ into the medium. Accordingly, the ultrasound generated by the frequency f2 is characterized by angles $\phi 22$ and $\phi 32$. By changing the frequency, the alignment of the beam can be carried out for optimized reception in the receiving transducer 12.

Figure 18:
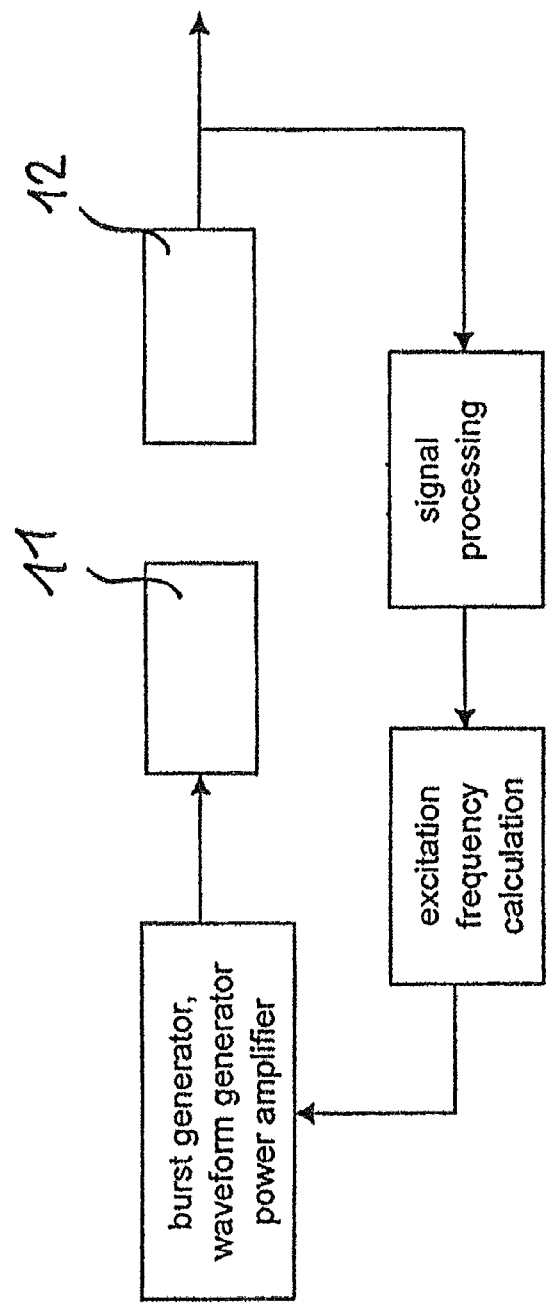
FIG. 18 shows a functional diagram for the operation of the object according to the invention according to FIG. 17, FIGS. 19 and 20 show overall views of individual objects according to the invention.

By way of the frequency adaptation, which can also be performed automatically according to the schematic of FIG. 18, changes of the speed of sound in the medium, for example, as a result of a changing medium, as a result of temperature variations or pressure variations, can be compensated for. In addition, by way of the targeted excitation of Lamb waves, a plurality of longitudinal waves which are offset in the axial direction can be generated, so that the probability of receiving a sufficiently precise received signal at an axially offset receiver is increased.

According to FIG. 18, the signal strength can be adapted and optionally improved via a feedback loop carried out alternately during the measurements. An optimum signal is thus found ("auto-alignment").

A method according to the invention for adapting the signal is described hereafter. The excitation transducer 11 is operated via a burst generator or a frequency generator and an amplifier. The signal received in the receiving transducer 12 is used to determine the flow velocity. A "frequency sweep" is started from time to time, for example, in a feedback loop between the actual measurements or as a part thereof. Of the variety of the frequencies then output by the excitation transducer, those which result in an optimum received signal are then searched out.

Figure 19:
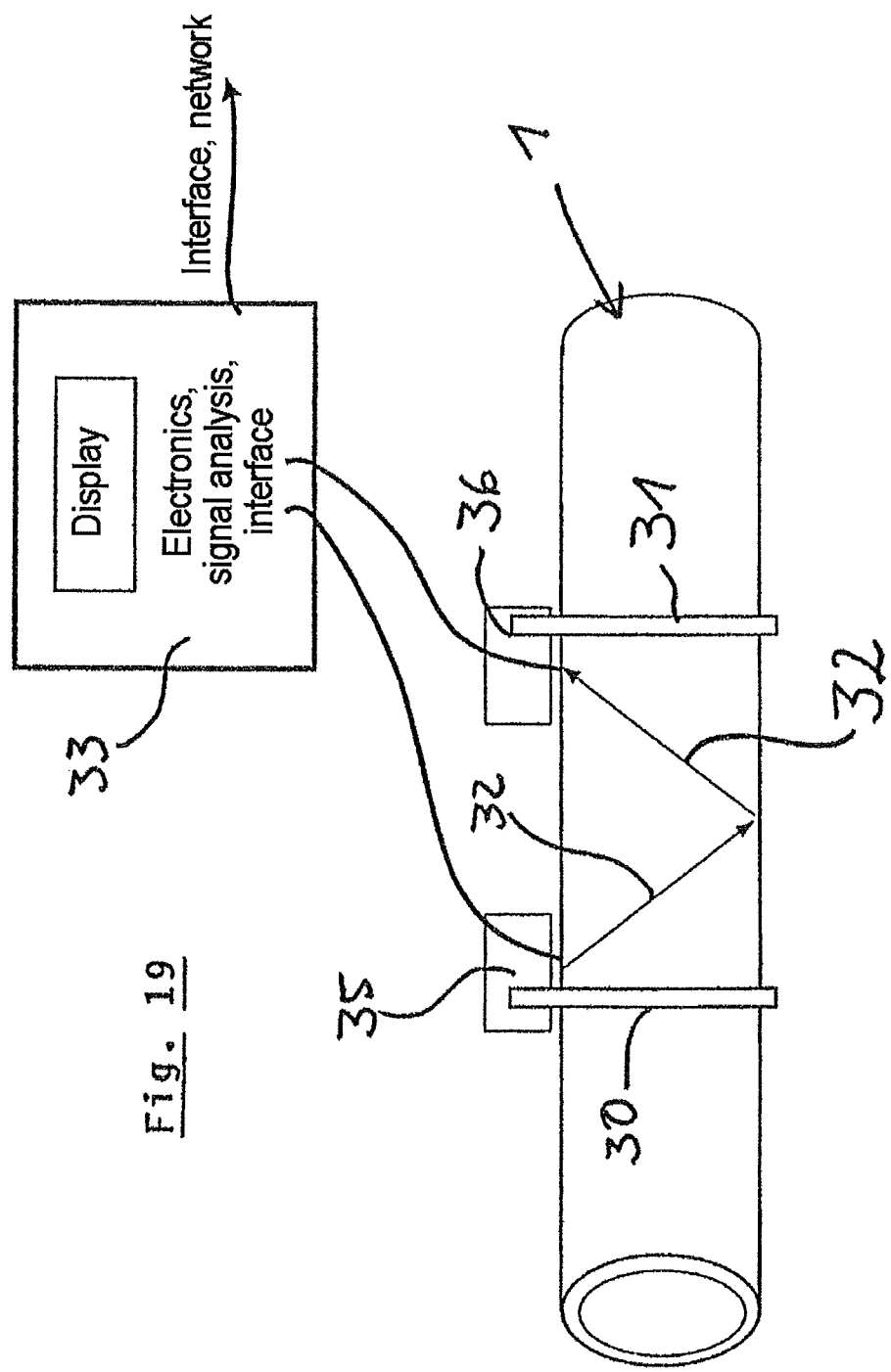
Figure 20:
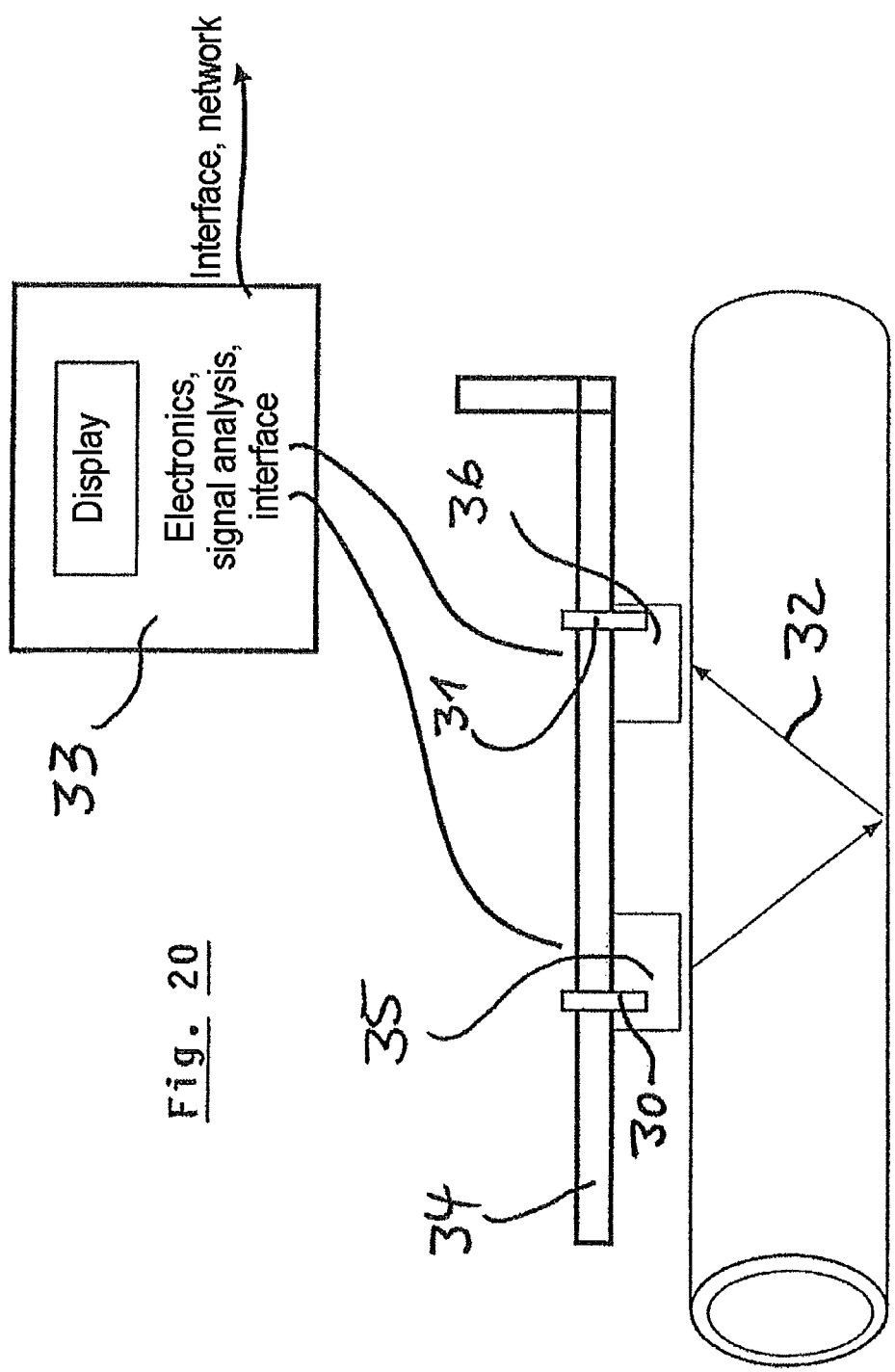

A partial construction of a flow rate meter according to the invention is shown in FIGS. 19 and 20. The magnetic field generators are not shown. Two mounts 30 and 31 of a flow rate meter are implemented in FIG. 19 in such a manner that they can be laid completely around the pipe 1. These are preferably hose clamps which can be provided with variable diameters. A sound wave, which is indicated via dashes 32, is then generated in the pipe 1 by means of the transducers 35 and 36. The associated permanent magnets are located within the housing of the transducers 35 and 36 in the exemplary embodiments of FIGS. 19 and 20.

The signal generated by the excitation transducer 35 is received by the receiving transducer 36 and relayed to electronics 33, in which the signal analysis occurs and from where the signal can be fed further into a network. A flow rate meter according to the invention can also have a display unit for displaying items of information. For the case of high-temperature applications in a range of greater than 180° C., preferably greater than 300° C., the excitation and receiving transducers 35 and 36 are mounted by means of the mounts 30 and 31 on an additional mounting system 34 (FIG. 20). In this way, the transducers 35, 36 are mounted spaced apart from the pipe and mechanically decoupled therefrom. Otherwise, the construction is like that in FIG. 19.

Figure 21:
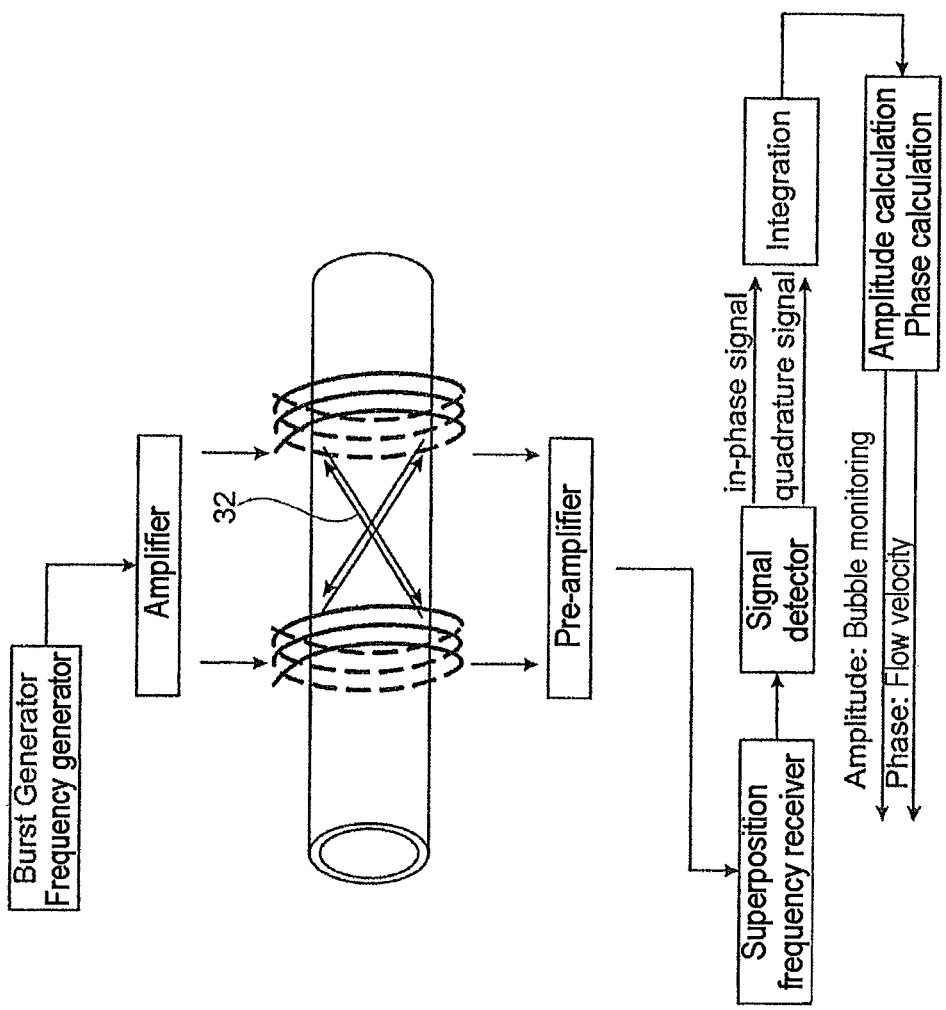
FIG. 21 shows a functional diagram to illustrate a method according to the invention.

A complete function diagram of the method sequence is shown in FIG. 21. In this case, for the detection of a flow rate, a signal is provided in the excitation transducer via a frequency generator and an amplifier, which signal generates an ultrasonic wave using an above-described setup. The illustrated setup includes two pairs of excitation and receiving transducers which are wound in parallel and completely around the pipe. The signals received by the two receiving transducers are transferred to a preamplifier. The signals are relayed from the preamplifier to a superposition frequency receiver. In a downstream integrator, the signals detected by the signal detector, for example, a quadrature amplitude modulator, are amplified and used for the amplitude calculation and phase calculation. The flow velocity then results from the phase calculation of the ultrasonic waves, while a determination of bubbles in the liquid can be performed from the amplitude analysis.

Figure 22:
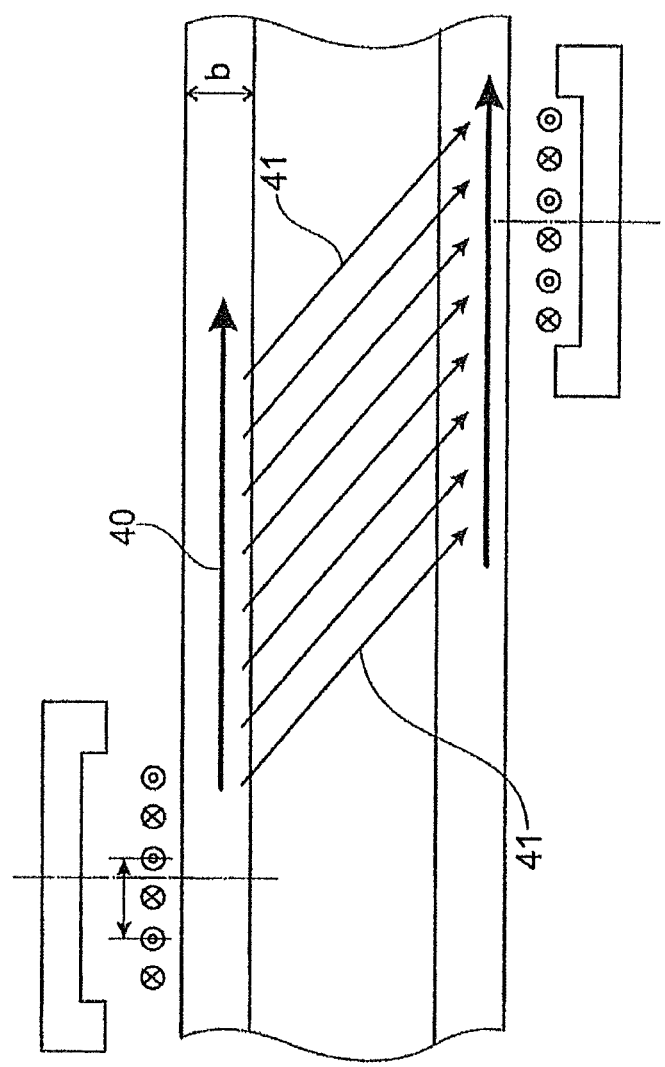
FIG. 22 shows an object according to the invention in a further configuration.

FIG. 22 shows a flow rate meter according to the invention in a further configuration, in which the excitation transducer is designed for the generation of Lamb waves 40. These pressure/shear waves propagate as a guided wave in the object, which results in a very uniform through transmission of the free interior using a plurality of longitudinal waves 41. Such a flow rate meter according to the invention is particularly insensitive with respect to the spacing of excitation transducer to receiving transducer due to the plurality of the longitudinal waves. The layout of the transducers is performed in the example of FIG. 22 in particular depending on the wall thickness b of the object, i.e. the high frequency of the transducers is adapted depending on the wall thickness b of the object.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

The invention claimed is:

1. An acoustic flow rate meter for the noninvasive determination of the flow or the flow rate in electrically conductive objects through which media flow comprising:
    an excitation transducer for generating at least one ultrasonic guided wave in the object, said at least one ultrasonic wave being coupled into the medium as a longitudinal wave on an inner side of the object oriented toward the medium, and
    a receiving transducer for the detection of an ultrasonic signal in the object, wherein the ultrasonic signal at least partially results due to the longitudinal wave, wherein the excitation transducer is implemented as a high-frequency induction coil, while omitting an acoustic coupling of the excitation transducer with the surface of the object, to generate a varying magnetic field in a surface-proximal region of the object, which is metallic, and the ultrasonic wave is generated by interaction of the varying magnetic field with a static or quasi-static magnetic field in this region.

2. The flow rate meter according to claim 1, characterized in that the receiving transducer is implemented as a high-frequency induction coil for the detection of the ultrasonic signal while omitting an acoustic coupling with the object.

3. The flow rate meter according to claim 1, characterized by an implementation to generate a static or quasi-static magnetic field, which is implemented in by at least one of a permanent magnet and an electromagnet, and which is one of aligned along an axial direction of the object and perpendicularly thereto.

4. The flow rate meter according to claim 1, characterized in that a conductor path of the high-frequency induction coil is aligned perpendicularly to the longitudinal axis of the object for the intended application.

5. The flow rate meter according to claim 4, characterized in that the conductor path is implemented as meandering.

6. The flow rate meter according to claim 1, characterized in that the excitation transducer generates guided waves in the form of Lamb waves of the nth order with n being an integer and being greater than or equal to 0.

7. The flow rate meter according to claim 1, characterized in that at least one of the side of the excitation transducer and receiving transducer to be oriented toward the object is implemented as curved.

8. The flow rate meter according to claim 1, characterized in that at least one of the excitation transducer and the receiving transducer is implemented to be at least one of applied to the pipe and wrapped around the pipe.

9. The flow rate meter according to claim 8, characterized in that the excitation and receiving transducers have conductor paths to be wound or laid around the object.

10. The flow rate meter according to claim 9, characterized in that at least one of excitation and receiving transducers are implemented as at least partially flexible, to be adaptable to different pipe external diameters.

11. The flow rate meter according to claim 9, characterized in that at least one of the excitation and receiving transducers have a film provided with at least one of an electrical conductor and a flat band cable, which can be wound at least partially around the pipe.

12. The flow rate meter according to claim 9, characterized in that at least one of the conductor paths is implemented as meandering.

13. The flow rate meter according to claim 8, characterized in that at least one of the excitation and receiving transducers are implemented as at least partially flexible, to be adaptable to different pipe external diameters.

14. The flow rate meter according to claim 13, characterized in that at least one of the excitation and receiving transducers have a film provided with at least one of an electrical conductor and a flat band cable, which can be wound at least partially around the pipe.

15. The flow rate meter according to claim 8, characterized in that at least one of the excitation and receiving transducers have a film provided with at least one of an electrical conductor and a flat band cable, which can be wound at least partially around the pipe.

16. The flow rate meter according to claim 1, characterized in that at least one of the excitation and receiving transducers are designed for the purpose of detecting the flow rate in a complete cross-section of the pipe.

17. The flow rate meter according to claim 1, characterized in that an analysis unit is implemented for at least one of the detection and size determination of bubbles in the medium.

18. The flow rate meter according to claim 1, characterized in that, for optimized alignment of a longitudinal wave to be generated in the medium, the high frequency at which the excitation transducer is to be operated is automatically variable.

19. The flow rate meter according to claim 1, characterized by an implementation for measuring at least one of the wall thickness and the pressure of the medium on the basis of the ultrasonic signal.

20. The flow rate meter according to claim 1, characterized in that the excitation and receiving transducers comprise heat resistant materials in such a manner that they are implemented for the contactless measurement of the flow rate in an object hotter than 180° C.

21. The flow rate meter according to claim 1, characterized by a modular construction wherein that at least one of the excitation and receiving transducers are permanently positionable on the object and are connectable to an activation and analysis unit, which is portable by operators, for measuring the flow rate, wherein the flow rate meter has a device for generating the static or quasi-static magnetic field.

22. The flow rate meter according to claim 1, characterized in that the high-frequency induction coil for generating the ultrasonic guided wave is operable in a frequency range of 20 kHz to 50 MHz.

* * * * *